July 20, 1937.   J. M. GWINN, JR   2,087,404
AIRCRAFT
Filed May 3, 1935

INVENTOR
Joseph Marr Gwinn Jr.

Patented July 20, 1937

2,087,404

UNITED STATES PATENT OFFICE 2,087,404

AIRCRAFT

Joseph Marr Gwinn, Jr., Buffalo, N. Y.

Application May 3, 1935, Serial No. 19,690

7 Claims. (Cl. 244—111)

This invention relates to aircraft and more particularly to the simplification of the control of aircraft.

One object of this invention is to provide a single control means for variable lift means control and for landing gear wheel brake control.

Another object of this invention is to connect said variable lift means control and said landing gear wheel brake control to said control means in such a manner that when said variable lift means is in the high lift position said wheel brakes are in the brakes off position, and when said variable lift means is in the low lift position said wheel brakes are in the brakes on position.

Another object of this invention is the provision of locking means whereby the position of said variable lift means or the amount of braking effort at said landing gear wheels may be held constant without continued application of force by the pilot to said control means.

Other objects and advantages of the invention will be apparent from the following description, the appended claims, and the accompanying drawing, in which,—

Figure 1:
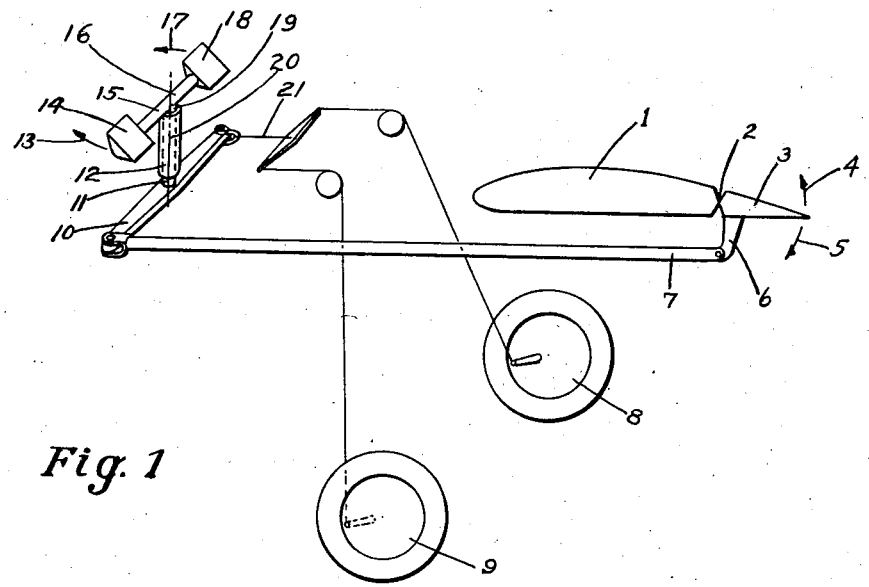
Fig. 1 is a diagrammatic illustration of the preferred form of the invention.

In landing aircraft having variable lift means it is usually desirable to have the variable lift means in a high lift position during both the approach to the ground and the actual contacting with the ground. However, as soon as contact with the ground is achieved, it is desirable to immediately shift the variable lift means to the low lift position, thus reducing the aerodynamic lift on the aircraft and making the aircraft stay firmly on the ground after landing. It is furthermore usually desirable after landing to reduce the speed of the aircraft relative to the ground, and this reduction in speed is usually accomplished by means of wheel brakes. Thus, immediately upon landing, it becomes desirable not only to move the variable lift means to a low lift position, but also to move the wheel brakes to a brakes on position. It would be a great aid to the pilot if these two operations were performed by one control operation. This is accomplished in accordance with this invention either by inter-connecting the variable lift means control and the landing gear wheel brake control or by connecting the variable lift means control and the landing gear wheel brake control to a single control means operated by the pilot, as shown in the drawing.

Referring to the drawing, I represents, in section, the wing of an aircraft. The variable lift means shown comprises flap 3 hinged about axis 2 at the rear edge of wing I. The control for flap 3 comprises lever 6 and rod 7. The control means 16 is foot operated and comprises levers 10 and 15 which are firmly attached to shaft 11, together with pedals 14 and 18 attached to lever 15. Support 12, which is firmly attached to the aircraft structure (not shown in the drawing), supports control means 16 in such a manner that control means 16 can rotate about axis 20. Rod 7, or other equivalent variable lift means control, attaches to lever 10. Attached also to lever 10 is wheel brake control cable 21 or other equivalent wheel brake control. Motion of pedal 14 in direction 13 moves flap 3 downward in direction 5 to a high lift position, and slackens brake control cable 21, releasing brakes 8 and 9. Moving pedal 18 in the direction 17 moves flap 3 in the direction 4 to a low lift position, and tightens cable 21, energizing brakes 8 and 9.

Figure 2:
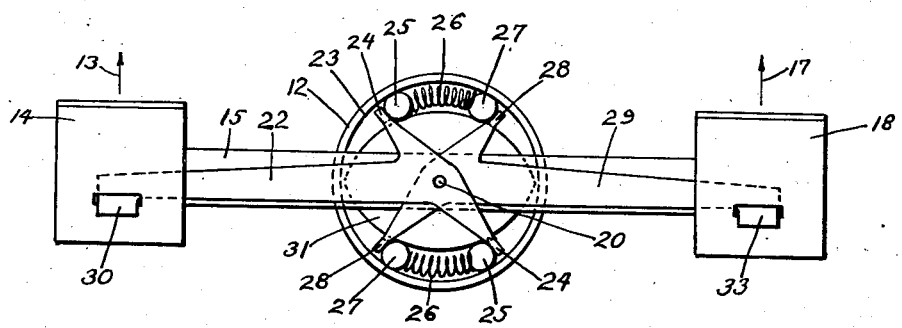
Fig. 2 is a plan view of the control means, showing the locking means.

To avoid tiring the pilot it is desirable to provide a locking means to hold control means 16 in any desired position. The preferred form of locking means, shown in plan view in Fig. 2, is of the automatic ball and cam type, located at 19, the attachment of lever 15 to shaft 11. Cam 31 is locked against rotation about axis 20 by the wedging action of balls 25 and 27 on the inner surface 23 of support 12. Lever 15, being firmly attached to cam 31, is thus locked in place relative to support 12 and to the aircraft structure. If the pilot presses on pedal 14 to produce motion in direction 13, the foot first contacts lug 30 on lever 22, rotating lever 22 relative to lever 15 and cam 31 in direction 13. Lugs 24, attached to lever 22, press against balls 25 and rotate them in direction 13 relative to cam 31. The wedging action between balls 25, cam 31 and surface 23 is thus eliminated, and a cam 31, together with lever 15, is able to rotate in direction 13. Similarly, pressure on pedal 18 and lug 33 unlocks balls 27 and permits rotation in direction 17. When pressure is removed from lugs 30 or 33, springs 26 force balls 25 and 27 back into a wedging position.

Figures 3, 4:
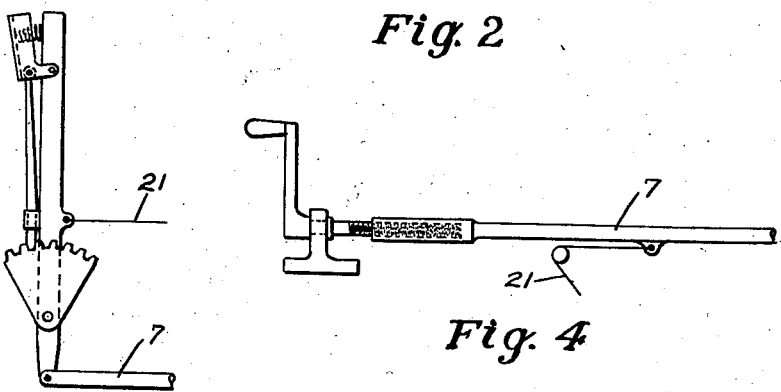
Figs. 3 and 4 are side elevations of modified control means and locking means.

If the aircraft is equipped with foot operated rudder controls, a hand operated control means is preferred. Fig. 3 shows a hand operated lever with a hand operated ratchet type locking means for use where the control forces are not large. Fig. 4 shows a screw and nut type of hand operated control means and locking means for use where the control forces are larger. When the control forces are too great for direct operation of the control means by the pilot, power control means such as electric motors or fluid pressure operated mechanisms are preferred.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a variable lift means and control therefor, landing gear wheel brake means and control therefor, and a control means connected to said variable lift means control and to said wheel brake control in such a manner that motion of said control means in a direction to move said variable lift means toward the high lift position moves said wheel brake means toward the brake off position, and that motion of said control means in a direction to move said variable lift means toward the low lift position moves said wheel brake means toward the brake on position.

2. In an aircraft, in combination, a variable lift means and control therefor, a landing gear wheel brake and control therefor, and a control means connected to said variable lift means control and to said wheel brake control in such a manner that motion of said control means in a direction to move said variable lift means toward the high lift position moves said wheel brake toward the brake off position, and that motion of said control means in a direction to move said variable lift means toward the low lift position moves said wheel brake toward the brake on position, together with locking means to hold said combination in constant position.

3. In an aircraft, a sustaining surface having a flap attached thereto, control means for said flap, a landing gear wheel brake and control means therefor, and a control means connected to said flap control means and to said wheel brake controls in such a manner that motion of said control means in a direction to move said flap toward the high lift position moves said wheel brake toward the brake off position, and that motion of said control means in a direction to move said flap toward the low lift position moves said wheel brake toward the brake on position.

4. In an aircraft, a sustaining surface having a flap attached thereto, control means for said flap, a landing gear wheel brake and a control therefor, and a foot operated pedal connected to said flap control means and to said wheel brake control in such a manner that motion of said pedal in a direction to move said flap toward the high lift position moves said wheel brake toward the brake off position, and that motion of said pedal in a direction to move said flap toward the low lift position moves said wheel brake toward the brake on position.

5. In an aircraft, a sustaining surface having a flap attached thereto, control means for said flap, a landing gear wheel brake and control therefor, and a hand operated lever connected to said flap control means and to said wheel brake control in such a manner that motion of said lever in a direction to move said flap toward the high lift position moves said wheel brake toward the brake off position, and that motion of said lever in a direction to move said flap toward the low lift position moves said wheel brake toward the brake on position.

6. In an aircraft, variable lift means and control means therefor, a landing wheel brake and control means therefor, means connecting said wheel brake control means to said variable lift means in such a manner that motion of said variable lift control means in a direction to move said variable lift means toward the high lift position moves said wheel brake toward the brake off position, and that motion of said control means in a direction to move said variable lift means toward the low lift position moves said wheel brake toward the brake on position.

7. In an aircraft, a landing wheel brake and control means therefor, variable lift means and a control therefor, means connecting said variable lift means control to said wheel brake in such a manner that motion of said wheel brake control means in a direction to move said wheel brake toward the brake off position moves said variable lift means toward the high lift position, and that motion of said wheel brake control means in a direction to move said wheel brake toward the brake on position moves said variable lift means toward the low lift position.

JOSEPH MARR GWINN, Jr.